United States Patent [19]

Dumont et al.

[11] 4,022,236

[45] May 10, 1977

[54] SAFETY DEVICE FOR A COMPRESSED GAS TANK

[75] Inventors: Pierre Dumont; Jacques Vigreux, both of Lyon, France

[73] Assignee: Delle-Alsthom, Villeurbanne; France

[22] Filed: Apr. 3, 1975

[21] Appl. No.: 564,973

[30] Foreign Application Priority Data

Apr. 26, 1974 France .............................. 74.14707

[52] U.S. Cl. .................................. 137/70; 137/312; 137/469; 220/89 A
[51] Int. Cl.² ........................................ F16K 13/04
[58] Field of Search .............. 137/70, 71, 312, 469; 220/89 A

[56] References Cited

UNITED STATES PATENTS

| | | | |
|---|---|---|---|
| 2,416,855 | 3/1947 | St. Clair | 137/469 |
| 2,576,517 | 11/1951 | Jurs | 137/469 |
| 2,587,933 | 3/1952 | Volpin | 137/70 |
| 2,654,388 | 10/1953 | Glass | 137/312 |
| 2,732,857 | 1/1956 | Jurs | 137/469 X |
| 3,344,807 | 10/1967 | Lehrer | 137/312 UX |
| 3,840,037 | 10/1974 | Erb | 137/70 |

*Primary Examiner*—Harold W. Weakley
*Attorney, Agent, or Firm*—Sughrue, Rothwell, Mion, Zinn & Macpeak

[57] ABSTRACT

Safety device for a compressed gas tank comprising a membrane influenced by an elastic effort and resting simultaneously on two concentric seats. It is characterized in that the applying of the pressure to the seat having the smallest diameter corresponds to a sealing position and that the applying of the pressure to the seat having the greatest diameter causes a sudden opening of the device.

7 Claims, 1 Drawing Figure

U.S. Patent  May 10, 1977  4,022,236
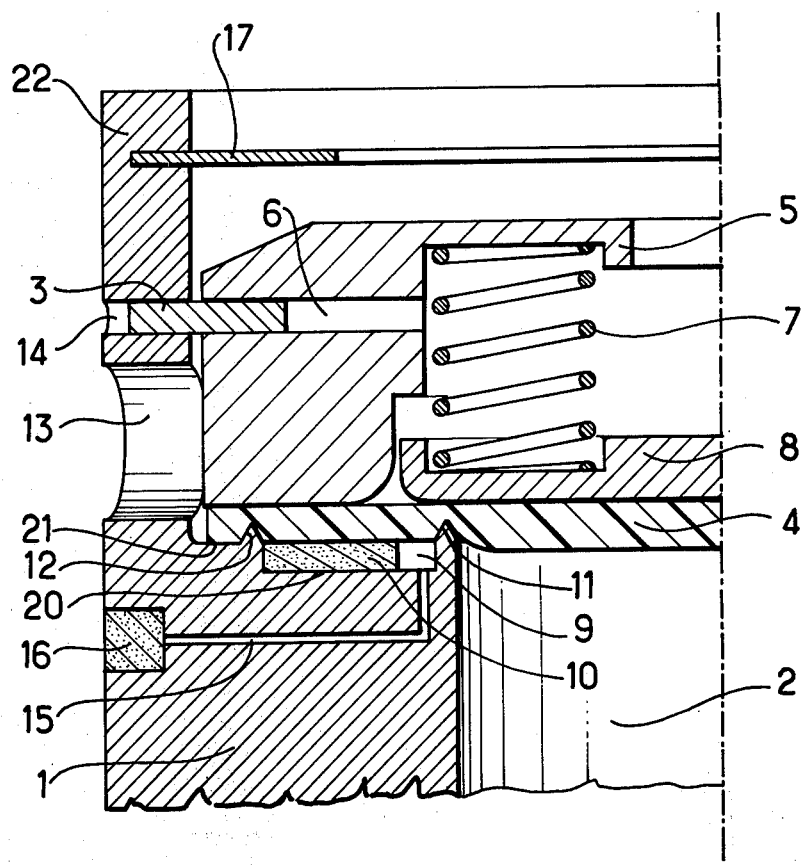

SAFETY DEVICE FOR A COMPRESSED GAS TANK

BACKGROUND OF THE INVENTION

1. Field of the Invention

The invention concerns safety devices for compressed gas tanks in the presence of an accidental overpressure occurring in the tank.

2. Description of the Prior Art

Most of these devices consist either of membranes or tear capsules, or of safety valves whose clack is applied on a seat by means of a calibrating spring. But such devices do not make it possible to obtain operation comprising simultaneously very accurate adjusting of the discharge pressure and a very slight difference in that pressure with respect to the normal operating pressure.

SUMMARY OF THE INVENTION

The object of the invention is a safety device for a compressed gas enclosure making it possible to obtain a very slight difference between the pressure of the gas at which the sealing of the tank is ensured and the pressure corresponding to the removal of the gas under overpressure.

The invention has as its object a safety device for a compressed gas tank, comprising a gas discharge orifice operating in the case of overpressure and an elastic blocking membrane for that orifice, characterized in that the draining orifice comprises two concentric seats, the one an inside seat, and the other an outside seat, the said membrane being applied against the inside seat by a mobile central plate subjected to the action of pressure springs and against the outside seat by a ring concentric to the mobile plate.

According to one characteristic, the ring is subject to the action of the orifice of the tank by a breaking piece whose breaking occurs suddenly under the effort of a predetermined overpressure.

According to another characteristic, the pressure springs are installed between the mobile plate and the ring.

The characteristics and advantages of the device according to the invention will become apparent from the description of an embodiment given by way of an example and illustrated in the figure.

The FIGURE is a half cutaway view through the axis of the device according to the invention.

DESCRIPTION OF THE PREFERRED EMBODIMENT

In the drawings, the body of a discharge orifice of a compressed gas tank has been designated as 1. That body comprises a vertical inside wall limiting an opening 2, a horizontal shoulder 21 and a vertical outside skirt 22. The horizontal shoulder 21 comprises an inside annular seat 11 connected to the opening 2, an outside annular seat 12 having a larger diameter and, between the two seats, an annular recess 20. A washer 10 lies within a groove 20 which constituting a leakage collector 9 for the compressed gas. The collector 9 is connected by a leakage duct 15 to an orifice 16 leading to the outside atmosphere.

The opening 2 is stopped up by a resilient membrane 4 applied on the horizontal shoulder 21. The membrane 4 is compressed on the one hand against the outside seat 12 by a ring 5 and on the other hand against the inside seat by a mobile central plate (8) subjected to the action of compression springs 7, only one of which is shown. The elastic membrane 4 also rests against the washer 10.

The ring 5 is kept compressed on the membrane by means of breaking parts such as 3 sunk simultaneously in the calibrated holes 6 of the ring and in calibrated holes 14 arranged opposite in the skirt 22. A series of lateral orifices 13 having a total cross-section at least equal to that of the opening 2 are formed in the skirt 22.

The cross-section of the breaking parts can have any shape: circular, square, rectangular. The number and the resistance to shearing of the breaking parts 3 are determined so as to obtain, with sufficient certainty, on the one hand, the resistance to the maximum operating pressure of the tank affecting the cross-section limited by the seat 11 and, on the other hand, shearing at a pressure slightly greater than the maximum operating pressure affecting the cross-section limited by the seat 12. The material constituting the breaking parts 3 preferably has the following characteristics: very low breaking elongation, yield strenght very close to breaking strength, breaking load and hardness slight compared to those of component materials of the parts 1 and 5. By way of an example having no limiting character, sintered materials and more particularly those basically containing iron or graphite may be employed.

The membrane 4 is made of an elastomer chosen, on the one hand, for its chemical inertia and its high resistance to diffusion with respect to the gas of the tank and, on the other hand, for its lack of adherence on contact under pressure with the materials of the seats 11 and 12 and of the ring 10. Contingently, the surfaces of these elements can undergo an anti-adherence treatment. Lastly, the thickness and the compression modulus of the elastomer are determined so as to ensure the maintaining throughout time of the original sealing of the seats.

The calibrated holes 6 of the ring 5 which correspond to the holes 14 of the skirt 22 act as recesses for the breaking parts 3. The ring 5, on the one hand, applies the membrane 4 simultaneously on the seat 12 and the washer 10 and, on the other hand, acts as a bearing point for the spring(s) 7. The function of these latter is double: applying, by means of the mobile plate 8, the membrane 4 onto the seat 11 with a view to ensuring sealing and resisting the effort due to the pressure exerted on a cross-section which is a little larger than that on the cross-section of the orifice 2 and, if required, on the cross-section of the seat 11.

The ring 10 has a multiple function: it supports the membrane 4 and prevents its elastic deformation between the two seats in order to push back as far as possible towards the orifice 2 the volume of elastomer corresponding to the embedding of the seats and to the slight reduction in thickness due to the compression. Furthermore, due to its surface condition or texture characteristics, the washer 10 enables the gas to exert its thrust on the seat 12 when the increasing pressure has cancelled the sealing of the seat 11. Preferably, the washer 10 is made of a porous material having a slight compactness and internal resistance. But the parts 1 and 10 can also be merged and made of the same material as the part 1. The surface between the seat 12 and the collector 9 then has a roughness making it possible to ensure the passing of the gas.

The leakage return duct 15 collects the micro-leakages due to any cause, such as a slight geometrical defect of the seat 11, slight porosity of the membrane or dirt between the seat and the membrane removes these leakages in order to avoid any spurious pressure which could, by accumulation of gas, cause, after a time, an accidental opening.

The calibrated opening 16 of the duct 15 makes it possible to remove the leakages but, in the case of an accidental increase of the pressure in the tank causing the cancelling of the sealing, causes a loss of head such that it practically maintains the pressure and enables a clear operation of the safety device. Preferably, the calibrated opening 16 is formed by means of a porous material.

A protective housing 17, in the form of a ring fast with the skirt 22 and made of a material having great resilience and elongation, prevents the ejecting of the parts released by the shearing of the breaking parts 3. The plastic deformation of the ring absorbs a great part of the energy brought into play during the operation of the safety device.

For the assembling of the unit and the fixing by the breaking parts 3, it is necessary to maintain, by a temporary means, the springs compressed between the ring 5 and the plate 8, in order to enable suitable installing of the membrane: the subsequent releasing of the springs deforms the membrane towards the inside of the orifice 2.

During operation, the operating pressure is exerted on the surface limited by the seat 11; the corresponding effort is then balanced by the springs and represents, for example, for the maximum operating pressure, only two thirds of the average effort necessary for the shearing of the breaking parts 3. As the pressure increases, at the instant immediately preceding, a lower pressure was exerted on a slightly smaller cross-section, almost equivalent to that of the orifice 2 stopped up by the growth of the membrane. Thus, the loss of the sealing can be assimilated to that which would be caused by the movement of a differential piston between two seats, but here, the movement of the membrane effects, so to speak, a viscous movememt of material. According to experience, in the vicinity of the limit of operation, the increase in the pressure appears to mark a stage preceding the clear cancelling of sealing. At that instant, the springs 7 are then completely compressed and the periphery of the plate 8 abuts against the ring 5; the gas flows up to the second seat 12 and then exerts a corresponding effort on the cross-section limited by the seat 12 which is transmitted by the part 5 to the breaking parts 3. As that effort corresponds to about 1.5 times the average charge corresponding to the shearing of the breaking parts 3, these latter yield suddenly and allow the gas to escape towards the orifices 13.

Although the device which has just been described appears to afford the greatest advantages for the implementing of the invention, it will be understood that various modifications can be made thereto without going beyond the scope of the invention, it being possible to replace certain elements by others capable of fulfilling the same technical functions or an equivalent technical function therein.

We claim:

1. In combination, a safety device, a compressed gas tank including a cylindrical member defining a tank discharge passage for said tank and open to said tank interior, said cylindrical member including within said passage two spaced concentric seats, said safety device comprising a flexible membrane spanning across said passage, subjected on the one side to the gas pressure of the tank and on the other side to a biasing elastic effort, the improvement wherein: said membrane is urged by said elastic effort, on said one side, against said two spaced, concentric seats in opposition to said gas pressure such that a normal tank gas pressure on the membrane corresponds to a sealing position of the seat having the smallest diameter, and a tank gas overpressure is transmitted to the seat having the largest diameter by elastic deformation of the membrane to cause the sudden opening of the device, said membrane being pressed against the seat having the smallest diameter by a mobile circular central plate having a diameter slightly in excess of the seat having said smallest diameter and said membrane being pressed against the seat having the largest diameter by a ring concentric with the mobile plate, said biasing elastic effort comprising at least one spring mounted between the mobile plate and said ring, and at least one breaking part fixedly mounting said ring relative to said cylindrical member such that said breaking part breaks suddenly under the effect of a predetermined gas overpressure.

2. The device according to claim 1, wherein: a collector is provided between said two seats and a duct leads from the collector to the exterior of the tank for venting the collector to the atmosphere.

3. The device according to claim 2, wherein: a washer (10) made of a porous material is pressed against the one side of the membrane in the annular space between the two seats.

4. The device according to claim 1, wherein said at least one breaking part (3) is constituted by a sintered material.

5. The device according to claim 1, wherein said at least one breaking part is constituted by a material containing iron.

6. The device according to claim 1, wherein said at least one breaking part is constituted by a material containing graphite.

7. The device according to claim 1, wherein: a protective housing (17) is provided to prevent the ejecting of parts released by the breaking of the said least one breaking part (3).

* * * * *